United States Patent
Ragland et al.

(10) Patent No.: US 9,172,458 B2
(45) Date of Patent: Oct. 27, 2015

(54) METHOD AND APPARATUS FOR HIGH SYMBOL RATE COMMUNICATION SYSTEM WITH REDUCED OVERHEAD BANDWIDTH

(75) Inventors: Roderick Ragland, Silver Spring, MD (US); Nimesh Ambeskar, Germantown, MD (US); Michael Pierce, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1186 days.

(21) Appl. No.: 12/904,739

(22) Filed: Oct. 14, 2010

(65) Prior Publication Data
US 2012/0093072 A1    Apr. 19, 2012

(51) Int. Cl.
*H04B 7/185* (2006.01)
*H04B 7/204* (2006.01)

(52) U.S. Cl.
CPC .......... *H04B 7/18578* (2013.01); *H04B 7/2041* (2013.01)

(58) Field of Classification Search
CPC .................................................. H04B 7/18582
USPC ................................. 370/316, 315, 317, 314
See application file for complete search history.

(56) References Cited

U.S. PATENT DOCUMENTS

| | | | | |
|---|---|---|---|---|
| 5,898,743 A | * | 4/1999 | Shoji et al. | 370/514 |
| 6,108,317 A | * | 8/2000 | Jones et al. | 370/320 |
| 6,542,480 B1 | * | 4/2003 | Campanella | 370/324 |
| 2002/0113897 A1 | * | 8/2002 | Menkhoff | 348/571 |
| 2003/0054816 A1 | * | 3/2003 | Krebs et al. | 455/428 |
| 2006/0126576 A1 | * | 6/2006 | Dale et al. | 370/336 |
| 2007/0211646 A1 | * | 9/2007 | Majidi-Ahy et al. | 370/252 |
| 2008/0064323 A1 | * | 3/2008 | Barda | 455/3.01 |
| 2011/0275326 A1 | * | 11/2011 | Jayasimha et al. | 455/63.1 |

* cited by examiner

*Primary Examiner* — Hassan Kizou
*Assistant Examiner* — Abdelnabi Musa
(74) *Attorney, Agent, or Firm* — K&L Gates LLP

(57) ABSTRACT

A method of providing a high symbol rate communication system with reduced overhead bandwidth includes calculating a minimum feasible aperture length at a network operations center, setting a hub demodulator subsystem to use an aperture length calculated from the minimum feasible aperture length, broadcasting the aperture length to a VSAT, and receiving an inroute data stream from the VSAT utilizing the aperture length.

22 Claims, 3 Drawing Sheets

METHOD AND APPARATUS FOR HIGH SYMBOL RATE COMMUNICATION SYSTEM WITH REDUCED OVERHEAD BANDWIDTH

BACKGROUND

A satellite network system may provide high-speed Internet protocol (IP) satellite connectivity between corporate operations (hub) and multiple remote sites in a star topology. The hub demodulator subsystem (HDS) may be designed to support inroute processing at a high aggregate symbol rate, for example, of 9.8 Megasymbols per second (Msps), the aggregation comprising multiple high speed inroutes operating at various rates, for example, 2 Msps, 4 Msps and 6 Msps. However, with a fixed aperture length, system throughput will decrease with the use of higher symbol rate inroutes for a given fixed spectrum capacity, making the use of high speed inroutes inefficient when compared to multiple lower speed inroutes that can be used within the same spectrum capacity. The relative burst overhead will increase, and throughput decrease, with increase in the inroute symbol rate for a given spectrum capacity. As the burst overhead is fixed, throughput will decrease with decrease in allocated burst length.

The aperture, fixed in duration for example at 125 μs, is a significant component of the total burst-to-burst overhead in an offset quadrature phase-shift keying (OQPSK) system. At very high symbol rates such as 4 Msps and 6 Msps, the slot time is reduced such that the aperture occupies a greater number of slots in a frame compared to the number of slots occupied by the aperture when using a lower symbol rate frame. Thus for a given frame format, slot sizing, and spectrum capacity, the number of slots used for overhead in a burst allocation increases significantly at high symbol rates, thereby reducing the inroute efficiency compared to lower symbol rate inroutes.

SUMMARY

It is an object of the present invention to provide a system and method and apparatus for a high symbol rate communication system with reduced overhead bandwidth.

In accordance with an aspect of the present invention, a method of providing high speed inroutes includes calculating a minimum feasible aperture length at a network operations center, setting a hub demodulator subsystem to use an aperture length calculated from the minimum feasible aperture length, broadcasting the aperture length to a satellite terminal (ST), and receiving an inroute data stream from the ST utilizing the aperture length.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Satellite communications using existing systems, such as satellite network systems from Hughes Network Systems, LLC, may be capable of supporting user upload rates up to at least 6 Msps using high speed inroutes. However, overhead in the communications protocol may reduce the efficiency of high speed inroutes, making them less efficient than using multiple lower speed inroutes across several channels.

Figure 1:
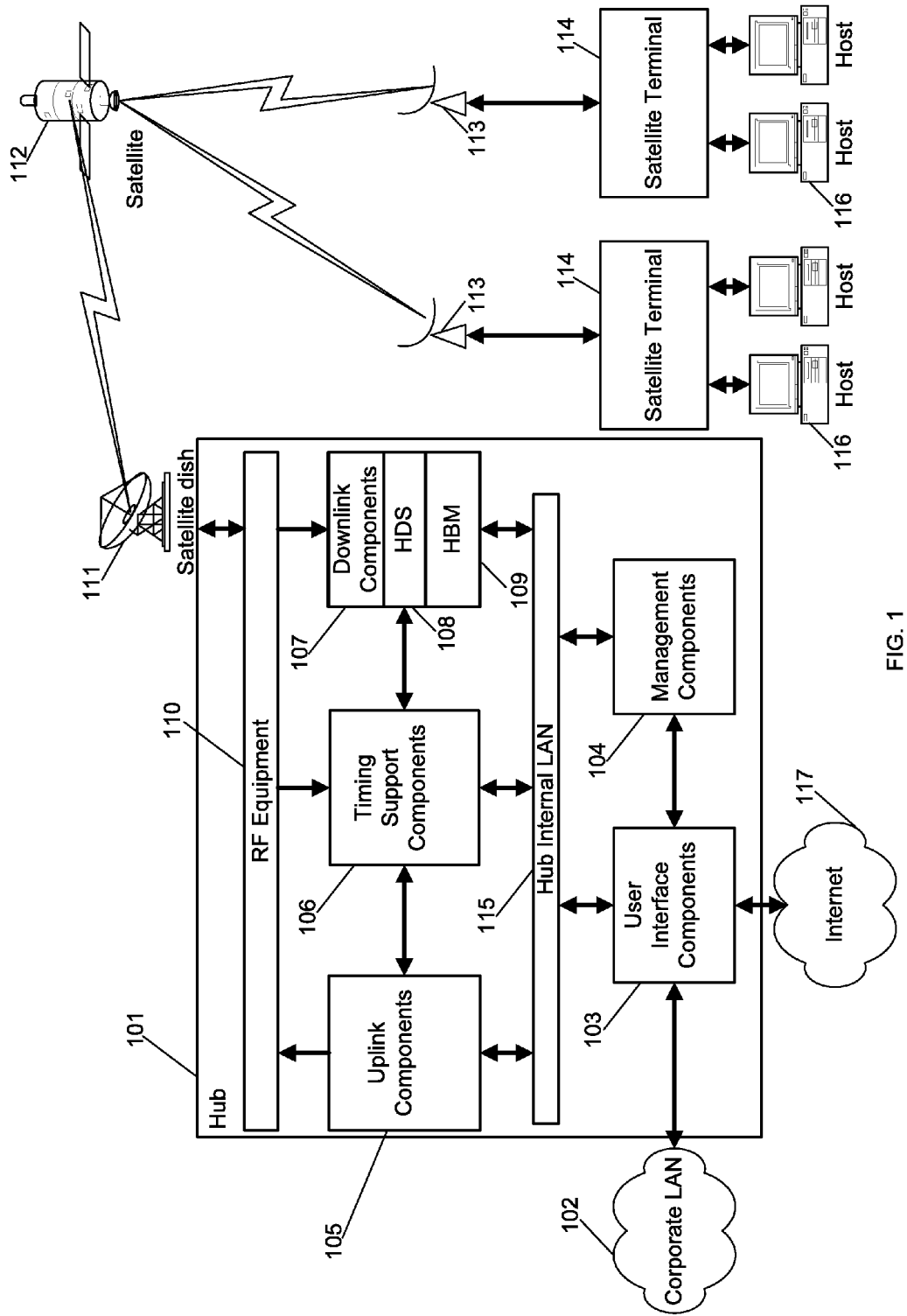
FIG. 1 depicts an exemplary communication system.

FIG. 1 depicts an exemplary communication system. The communication system may be, for example, a satellite communications system and may include a hub 101, a corporate LAN 102, a satellite dish 111, a satellite 112, remote satellite dishes 113, satellite terminals (ST) 114, remote hosts 116, and the Internet 117. In the exemplary embodiment, the hub 101 may operate as part of a Network Operations Center (NOC). The NOC may be responsible for monitoring the network for alarms or certain conditions that may require special attention to avoid impact on the network's performance. The hub 101 may communicate with multiple STs 114 over the uplink, and may have a larger satellite dish antenna 111. The hub 101 may broadcast a continuous carrier to hundreds or thousands of smaller STs 114 via a satellite transponder. The hub 101 uplink carrier signal may contain packets of digital data addressed to individual ST 114 stations of the system. The outlying STs 114 may transmit to other STs 114 or the hub 101 using established protocols on the downlink. The downlink may utilize an MF-TDMA protocol system.

The hub 101 may be an operations center from which an organization manages the rest of a network, for example, connecting a central location with several remote locations, and connecting all locations with the internet. For example, the hub 101 may be located at a corporations headquarters, and may connect the headquarters with remote offices. The hub 101 may include user interface components 103, management components 104, uplink components 105, timing support components 106, down link components 107, RF equipment 110, and satellite dish 111.

The user interface components 103 may be any suitable combination of hardware and software for allowing the hub 101 to connect to a corporate LAN 102 and/or the Internet 117. For example, the hub 101 may be used to establish a corporate LAN 102 through the user interface components 103. The corporate LAN 102 may be connected to the Internet 117 via the hub 101, using the user interface components 103. The user interface components 103 may also be in communication with the uplink components 105, timing support components 106, and downlink components 107, allowing remote hosts 116 to be connected to the corporate LAN 102 and/or the Internet 117.

The management components 104 may be any suitable combination of hardware and software to allow for the management and administration of the NOC, including the hub 101. The management components 104 may also be used to manage and administer the corporate LAN 102, for example, controlling access to the Internet 117. The connection between the hub 101 and the remote hosts 116 may also be managed through the management components 104.

For example, in a satellite network system, the management components 104 may include software for providing configuration and control interfaces for many of the components of the hub 101, for providing conditional access control for information transmitted through the service, a configuration management subsystem for providing a repository for software and configuration parameters to be downloaded to components of the hub 101, a management gateway that may handle network and hub 101 component management traffic, automated commissioning server for providing commissioning services for the STs 114, a database for storing network configuration data, a special services gateway for processing remote to hub 101 traffic for the STs 114 before they are commissioned.

The uplink components 105 may be any suitable combination of hardware and software for establishing an upstream connection between the hub 101 and the remote hosts 116 through the satellite 112. The uplink components 105 may be able to receive data, for example, from the corporate LAN 102 or the internet 117, and transmit that data to the remote hosts 116.

The uplink components 105 may perform the multiplexing and transmission of all outbound IP traffic from the hub 101. All outbound traffic may be formatted to conform to the DVB-S or DVB-S2 standards. The uplink components 105 may include satellite gateways, DVB modulators, and outroute redundancy equipment.

The uplink component 105 may receive bundled satellite traffic from the other hub 101 components over a LAN segment, format the traffic into individual packets, and forward packets over the satellite 112 through the RF equipment 110 and the satellite dish 111. The uplink component 105 may receive bundled satellite traffic over a hub internal LAN 115 from other subsystems in the hub 101, such as control information to be received by STs 114.

The timing support components 106 may be any suitable combination of hardware and software for providing timing support to the uplink components 105 and the downlink components 107. In order to maintain communications between the hub 101 and the remote hosts 116 though the satellite 112, various timing issues in the transmission and reception of data from and to the satellite 112 must be accounted for. For example, the STs 114 in the system may introduce timing jitter, and satellite drift due to satellite 112 motion.

The timing support components 106 provide master timing for the entire communication system. The timing support component 106 maintains the timing synchronization between the hub 101 and the STs 114. Specifically, in hub 101 the timing synchronization is maintained for the uplink 105 and downlink 107 components. The timing support components may utilize a closed looped timing (CLT) mechanism, where every ST 114 receives explicit timing correction feedback.

The downlink components 107 may be any suitable combination of hardware and software for establishing a downstream connection between the hub 101 and the remote hosts 116 through the satellite 112, any may include a hub demodulator subsystem (HDS) 108 and a hub bandwidth manager (HBM) 109.

The HBM 109 may be any suitable combination of hardware and software for managing downlink channel bandwidth in the communication system. The HBM 109 may perform all of the processing and control functions for the downlink. The HBM 109 may manage return channel bandwidth and the HDS 108, and may receive control and traffic bursts received by the HDS 108. The control bursts may contain ranging information, terminal status, or bandwidth requests. The traffic bursts may contain terminal IP traffic as well as piggybacked bandwidth requests. The HBM 109 may process each type of burst and constructs IP packets, which may be forwarded to the user interface components 103.

Different bandwidth allocation algorithms may be implemented on the HBM 109. The HBM 109 may also generate and load the burst time plans (BTP) to the HDS 108 and the STs 114. The BTPs are control messages that inform the HDS 108 to open aperture windows at specific times for detection of bursts transmitted from STs 114.

The downlink components 109 may include one or more of the HBM 109.

The HDS 108 may be any suitable combination of hardware and software for receiving data by demodulating and decoding downlink signals received at the hub 101 from the satellite 112. The HDS 108 may receive downlink signals from the RF equipment 110 and timing from the timing support components 106. The downlink may be processed by the HDS 108, including being demodulated and decoded, and forwarded to the HBM 109, which may then pass the received data to the user interface components 103, which may then be forwarded onto its final destination, such as, for example, the corporate LAN 102 or the Internet 117. The HDS 108 may be capable of receiving and processing downlink channels at up to 6 Msps. The HDS 108 may support a configurable aperture length, which may be set by default to 125 μs.

The RF equipment 110 may be any suitable combination of hardware and software for transmitting and receiving RF signals to and from the satellite 112, and may include a radio frequency terminal (RFT) and a system IF distribution module, which may use commercial, off-the-shelf equipment. The RF equipment 110 may transmit the RF signals received from the satellite 112 to the inroute subsystems, such as, for example, the downlink components 107, at RF, and may receive outroute signals in DVB asynchronous serial interface (ASI) format and modulate and transmit those signals as RF.

The RFT may take the uplink intermediate frequency (IF) output of the system IF distribution module, upconvert it to radio frequency (RF), and transmits it to the satellite 112 using the satellite dish 111. The RFT may also receive from the satellite 112 the RF echo of the transmitted signal, along with the RF input from the downlink, downconvert the signals to IF, and forward the downconverted signals to the system IF distribution module and then to the downlink components 107. The downlink may consist of multiple channels which are referred to as "inroutes", where each channel is an inroute.

The satellite dish 111 may be any suitable hardware for receiving RF signals from and transmitting RF signals to the satellite 112. The satellite dish 111 may be, for example, a motorized satellite dish mounted on or near a building that houses the hub 101. The satellite dish 111 may be mounted such that it has a clear line of sight to the satellite 112. The RF equipment 110 may send RF signals to the satellite dish 111, which may broadcast the RF signal to the satellite 112. The satellite dish 111 may transmit RF signals received from the satellite 112 to the RF equipment 110.

The satellite 112 may be any suitable communications satellite for connecting the hub 101 to the remote hosts 116. For example, the satellite 112 may be a Spacebus-3000B3 model satellite with 24 C-band and 24 Ku-band transponders for receiving and transmitting data from and to ground-based satellite dishes such as, for example, the satellite dish 111. The satellite 112 may support downlink channel access. The satellite 112, may be, for example, in geosynchronous orbit.

The remote satellite dishes 113 may be any suitable hardware for installation at site remote from the hub 101 for receiving RF signals from and transmitting RF signals to the satellite 112. For example, the remote satellite dishes 113 may be 0.74 m dishes. The remote satellite dishes 113 may be mounted with a clear line of sight to the satellite 112, and may be connected to the remote indoor receive/indoor transmit units that may components within the ST 114. RF signals transmitted from the satellite 112 may be received by the remote satellite dishes 113, and the remote satellite dishes 113 may transmit RF signals to the satellite 112.

The remote hosts 116 may be one or more computer systems or other electronic devices capable of network communications at a site remote from the hub 101. For example, the remote hosts 116 may be computers connected on a LAN at a remote office of a corporation operating the hub 101. Access to the corporate LAN 102 and the Internet 117 may be provided to the remote hosts 116 through connection to the hub 101 via the satellite 112.

A remote satellite dish 113, ST 114, and remote host 116 may form a Very Small Aperture Terminal (VSAT).

The satellite 112 may support multiple channels for downlink communication from the remote hosts 116 to the hub 101. Each of the ST 114 may be assigned TDMA timeslot(s) for access to a specific inroute channel. When using multiple channels for inroute communications, the upload speed of the remote hosts 116 may be limited. For example, if the satellite 112 uses 24 channels, the upload speed for any one of the remotes hosts 116 may be limited to 256 kilosymbols per second (ksps). The satellite 112 may also use, for example, only one channel which may have a maximum speed of 6 Msps.

Figure 2:
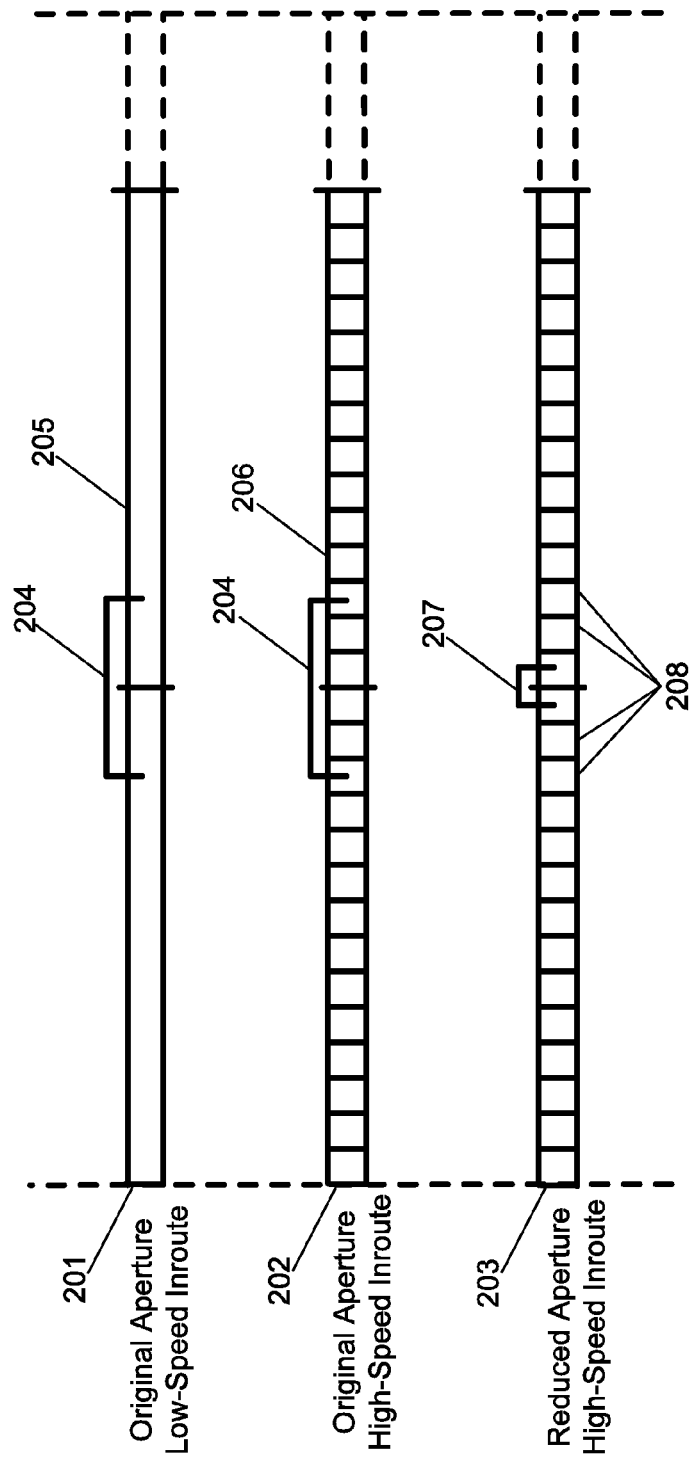
FIG. 2 depicts exemplary frames with varying slot and aperture sizes for inroute communications.

Data may be transmitted along the inroute channels from the remotes hosts 116 to the hub 101 in frames. FIG. 2 depicts exemplary frames with varying slot and aperture sizes for inroute communications. Low-speed frame 201 may be an exemplary data transmission frame for use with low-speed inroutes, for example, inroutes running at 256 ksps. Low-speed frame 201 may include 125 µs aperture 204, and 468 µs slots 205, though the slots 205 may be any suitable length and do not need to be the same length as the aperture 204. 125 µs may be the standard length for an aperture in a satellite network system with inroutes running at 256 ksps. Every low-speed frame 201 may contain 125 µs aperture(s) 204, which maybe a window used by the HDS 108 to detect the transmission by VSATs. The low-speed frame 201 may then include a number of 468 µs slots 205, for example, 96 slots, which may contain the data being transmitted at a rate of 120 symbols per slot. Each symbol may represent 2 bits of information for OQPSK modulation. The overhead data represented by the 125 µs aperture 204 may result in a 4.17% reduction in throughput when using the low-speed frame 201 to send data on inroutes running at 256 ksps. The slower-speed of the inroute using the low-speed frame 201 may allow for the use of multiple channels. For example, the satellite 112 may run 24 channels at 256 ksps.

To allow for faster uploads of data from the remote hosts 116 to the hub 101, higher-speed inroutes may be implemented by reducing the slot time. For example, original aperture high-speed frame 202 may be an exemplary data transmission frame for use with high-speed inroutes in a high symbol rate communication system. The original aperture high-speed frame 202 may use 20 µs slots 206. Each of the 20 µs slots 206 may contain 120 symbols, the same number of symbols as contained in the 468 µs slots 205 of the low-speed frame 201. Because the 20 µs slots 206 are smaller, more of them may be fit into the original aperture high-speed frame 202. For example, the original aperture high-speed frame 202 may contain 2,304 of the 20 µs slots 206, allowing for the inroute to be run at up to 6,144 ksps, or 6 Msps. However, the 125 µs aperture 204 may be the same in the original aperture high-speed frame 202 as in the low-speed frame 201. Because the 20 µs slots 206 are shorter than the 468 µs slots 205, the 125 µs aperture 204 may occupy more slots in the original aperture high-speed frame 202 than in the low-speed frame 201, resulting in further reductions in throughput. For example, the overhead from 125 µs aperture 204 may result in a reduction in throughput of 18.66% when using the original aperture high-speed frame 202 to send data on inroutes running at 6 Msps. This may make using a 6 Msps channel with a 125 µs aperture 204 less efficient than using 24 channels at 256 ksps each with a 125 µs aperture 204, which results in a throughput reduction of 4.17%, as discussed above.

To mitigate the throughput reduction on high-speed inroutes caused by the overhead of the 125 µs aperture 204, a smaller aperture may be used. For example, reduced aperture high-speed frame 203 may be an exemplary data transmission frame for use with high-speed inroutes on a high symbol rate communication system with reduced overhead bandwidth. The reduced aperture high-speed frame 203 may use, for example, a 10 µs aperture 207, along with 20 µs slots 206. This may result in more time being freed for additional 20 µs slots 206 in the reduced aperture high-speed frame 203, as compared to the original aperture high-speed frame 202. For example, the line 208 may indicate the additional 20 µs slots 206 allowed by the use of the 10 µs aperture 207. Use of the 10 µs aperture may result in a reduction in throughput of 3.17%, less than the reduction seen using the low-speed frame 201. Thus, even though the satellite 112 may be able to support only 1 channel running a high-speed inroute at 6 Msps, using the reduced aperture high-speed frame 203 with this single channel may be more efficient than using 24 channels at 256 ksps using the low-speed frame 201, as the reduction in throughput is only 3.17%, less than 18.66% reduction in throughput seen using the original aperture high-speed frame 202 with an aperture 204 of 125 µs.

Figure 3:
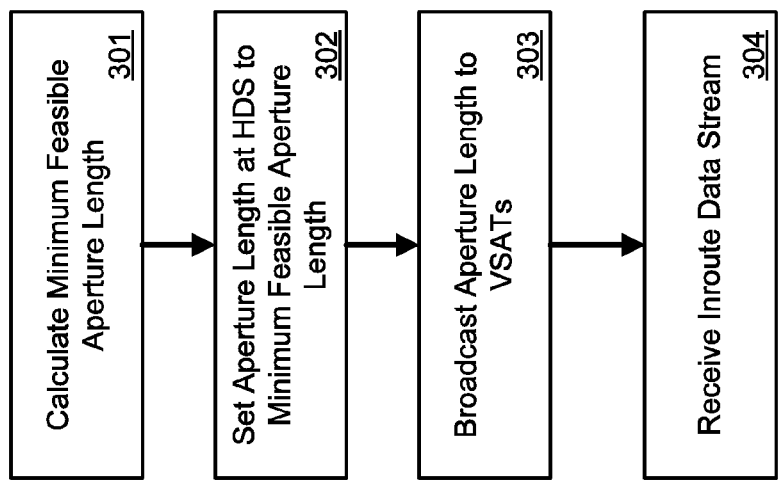
FIG. 3 depicts an exemplary procedure for providing a high symbol rate communication system with reduced overhead bandwidth.

Using a reduced aperture size, such as, for example, the 10 µs aperture 207, may allow for high-speed inroutes to be operated at higher efficiencies than multiple low-speed inroutes. This may allow the remote hosts 116 to upload data to the hub 101 through the satellite 112 much faster than if the inroutes were restricted to lower speeds. In order to set up a high-speed inroute for use by the remote hosts 116 on a high symbol rate communication system, the actual minimum feasible aperture size must be determined and communicated across the communications system. FIG. 3 depicts an exemplary procedure for providing a high symbol rate communication system with reduced overhead bandwidth.

In block 301, the minimum feasible aperture length may be calculated. Every communications system, such as the communication system depicted in FIG. 1, may have a different minimum feasible aperture length. If the aperture length is set too low for a given communications system, communications error may result rendering the inroute inefficient or unusable. Thus, when setting up a high-speed inroute, the hub 101 must first determine how short the aperture length can be.

Factors that may affect the implementation of shorter aperture length include unique word offset estimation error at the hub 101, VSAT transmit time jitter, and uplink bandwidth usage with closed loop timing (CLT). The existing CLT system feature may required to implement the short aperture lengths, as the VSATs may need timing feedbacks from the hub 101 to correct satellite drifts and stay within the short aperture. Based on these factors, the minimum aperture length may determined according to the formula:

$$\text{Aperture length} = [2j + Ts/4 + Td]*2,$$

where ±2j may be the burst to burst timing drift (jitter) window from ideal timing as observed by estimations at the hub 101, j may be transmit timing jitter, Td may be the timing drift correction threshold, and Ts may be Symbol Time. The timing drift correction threshold Td may be determined by the number of users that the network has to support as it corresponds to the closed loop timing feedback rate.

For a given communication system, an empirical estimate of the jitter window for use in the calculation may be determined by analyzing the hub 101 timing estimates from lab or simulation experiments and over-the-air system experiments. Transmit timing jitter values may increase with increases in inroute symbol rate.

For an inroute operating at 2 Msps, the timing drift (jitter) window (2j) may be at least ±8 µs, and may be as low as ±1 µs. Over-the-air measurements indicate timing jitter values may be higher than those determined in a lab environment. Timing jitter may be the variation between the actual transmission time from a VSAT and the scheduled transmission time for the VSAT.

For example, a communications system may have the parameters of a satellite drift of 9 nanoseconds/second, 5000 users supported by the communications system, CLT feedback updates at a rate of 5 users/second, Td (Drift Threshold) of 9 µs, and a jitter window [2j] of ±8 µs. The minimum aperture length for this communications system may be determined as [8+1+9]*2=36 µs. However, the jitter window and the minimum aperture length that can be implemented may not be deterministic for inroutes running at 4 Msps and 6 Msps.

In a satellite network system, a jitter window of 2 µs may be observed at inroutes of 2 Msps. If this jitter window can be maintained on inroutes at 4 Msps and 6 Msps, the satellite network system may support a minimum aperture length calculated as:

Transmit Timing Jitter (2j–burst to burst from actual timing as seen by hub)=5 µs (2 µs+2 µs+1 µs), where 2 µs may be jitter introduced by the transmitter, 2 µs may be the HDS 108 aperture opening error and an additional 1 µs margin.

Timing Drift Threshold (Td)=5 µs (2500 maximum users with 5 feedbacks per second).

UW offset estimation error=E=Ts/4=1 µs.

Minimum Aperture length=[2j+Td+Ts/4]*2=[5+5+1]*2=22 µs.

The minimum aperture length may also be determined through trial-and-error observation of real world use of different aperture lengths.

The minimum feasible aperture length may be smaller that what is necessary to achieve the desired reduction in overhead, depending on the slot size used by the desired inroute symbol rate. The minimum aperture length is the minimum length of aperture that could be used for the system. Once the minimum aperture length that the system could support has been determined, an optimal aperture length that uses the same number of overhead slots as the minimum aperture length may be determined and used instead of the minimum aperture length. The optimal aperture length may be max (aperture length)>=minimum aperture length which results in the same overhead as the minimum aperture length. This determination is based on the slot size used in the inroute frame structure. For example, if a 6 Msps inroute uses 10 µs slots and the calculated minimum aperture length is 12 µs, this may result in a 2 slot burst overhead. Because the slots are 10 µs, an aperture length of 20 µs may be used instead of 12 µs, as the overhead slots used with a 20 µs aperture are the same as those used for a 12 µs aperture, resulting in the same overhead reduction.

In block 302, the aperture length used by the HDS 108 may be set to the minimum feasible aperture length, or optimal aperture length, as determined in block 301. The HDS 108 may include a parameter of aperture length, which may be used by the HDS 108 when decoding and demodulating data received from the RF equipment 110 after being uploaded by the remote hosts 116 through the satellite 112. For example, in a standard satellite network system, the HDS 108 may be set to use an aperture length of 125 µs. Once the minimum feasible aperture length has been determined, for example, at the hub 101, the aperture length parameter of the HDS 108 may be changed to the minimum feasible aperture length, or optimal aperture length using, for example, the management components 104.

In block 303, the aperture length may be broadcast to the VSATs. After setting the HDS 108 to use the minimum feasible aperture length or optimal aperture length, the aperture length in use by the HDS 108 may be broadcast to the remote satellite dishes 113 and the STs 114, so that data from the remote hosts 116 may be transmitted back to the hub 101 using frames with the appropriate aperture length.

For example, during initialization the HBM 109 may compute the overhead slots using the formula:

Overhead in symbols=aperture length+unique word+ tail (15 symbols)+additional guard symbols (radio on/off)

A Unique Word may be a part of the ST transmission unit (burst). A tail may be included as a part of the ST transmission.

The HBM 109 may then use a control message to advertise the overhead slots to the VSATs. The size of the control message may require fewer bits than advertising the aperture length itself, and may avoid redundant computation of overhead slots at the VSATs. The HBM 109 may also be used the computed overhead slots to form burst allocations and Burst Time Plans (BTPs)

The HBM 109 and HDS 108 may also distinguish bursts with short apertures from bursts with normal aperture. The BTP payload format may use two bytes to represent one slot, with 0 representing an aperture of 125 µs, 1 representing a long aperture and 2 representing a shorter aperture, such as, for example, the minimum feasible aperture length.

In block 304, the inroute data stream may be received at the hub 101 from the VSATs. The inroute data stream may originate at the remote hosts 116, go through the STs 114, the remote satellite dishes 113, and the satellite 112. The inroute data stream may utilize the minimum feasible aperture length or optimal aperture length received at the VSATs in block 303, and may run at a high-speed, including, for example, at 6 Msps. The inroute data stream may be received by the satellite dish 111 as RF signals, converted into a data stream by the RF equipment 110 and sent to the HDS 108 to be demodulated and decoded based in part of the minimum feasible aperture length or optimal aperture length set at the HDS 108 in block 302. In this way, the remote hosts 116 may be able to use high-speed inroute to the hub 101 which are efficient due to the reduction overhead bandwidth that may result from using the shorter aperture length.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A non-transitory computer-readable storage medium with an executable program stored thereon, wherein the program instructs a processor associated with a hub demodulator subsystem, for providing a high symbol rate communication system with reduced overhead bandwidth, to:
    set an aperture length to a length calculated at a network operations center based on a minimum feasible aperture length calculated at the network operations center and slot sizes used by a desired inroute symbol rate, wherein the high symbol rate communication system uses a frame format with a frame having a frame length, the frame including a plurality of slots and an aperture which occupies at least a portion of a slot, and wherein the aperture length is shorter than the frame length; and
    receive an inroute data stream, from at least one Very Small Aperture Terminal (VSAT) to which the aperture length was broadcast, at the desired inroute symbol rate utilizing the aperture length.

2. The storage medium of claim 1, wherein the program further instructs the processor to perform the step of receiving the aperture length from a computer system for storing network configuration data.

3. The storage medium of claim 2, wherein the system for storing network configuration data calculates the minimum feasible aperture length according to the formula:

$$\text{aperture length} = [2j + Ts/4 + Td]*2,$$

wherein $\pm 2j$ is burst to burst timing drift window from ideal timing, j is transmit timing jitter, Td is timing drift correction threshold, and Ts is Symbol Time.

4. The storage medium of claim 1, wherein the aperture length is set to 10 μs.

5. The storage medium of claim 1, wherein the inroute data stream is at a rate of 6 Megasymbols per second.

6. The storage medium of claim 1, wherein the program further instructs the processor to perform the step of decoding and demodulating the inroute data stream utilizing the aperture length.

7. The storage medium of claim 1, wherein the aperture length is set to a length that is shorter than a slot length of the plurality of slots.

8. The storage medium of claim 1, wherein the frame includes 2,304 slots having a slot length of 20 μs and the aperture length is set to 10 μs.

9. A method of providing a high symbol rate communication system with reduced overhead bandwidth, comprising:
    calculating, at a network operations center, a minimum feasible aperture length;
    setting a hub demodulator subsystem to use an aperture length calculated from the minimum feasible aperture length, wherein the high symbol rate communication system uses a frame format with a frame having a frame length, the frame including a plurality of slots and an aperture which occupies at least a portion of a slot, wherein the aperture length is shorter than the frame length;
    broadcasting the aperture length to at least one Very Small Aperture Terminal (VSAT); and
    receiving at least one inroute data stream from the at least one VSAT utilizing the aperture length.

10. The method of claim 9, wherein the aperture length is less than 125 μs.

11. The method of claim 9, wherein the inroute data stream is routed through at least one satellite.

12. The method of claim 9, further comprising demodulating and the decoding the inroute data stream with the hub demodulator subsystem utilizing the aperture length.

13. The method of claim 9, wherein broadcasting the aperture length to at least one VSAT comprises broadcasting overhead slots to the VSAT.

14. The method of claim 13, wherein the overhead slots are calculated according to the formula:

overhead in symbols=aperture length+unique word+ tail+additional guard symbols.

15. The method of claim 9, wherein calculating the minimum feasible aperture length uses the formula:

minimum feasible aperture length=$[2j+Ts/4+Td]*2$, wherein $\pm 2j$ is burst to burst timing drift window from ideal timing, j is transmit timing jitter, Td is timing drift correction threshold, and Ts is Symbol Time.

16. The method of claim 9, wherein the aperture length is calculated from the minimum feasible aperture length based on the slot sizes used by a desired inroute symbol rate.

17. The method of claim 9, wherein the inroute data stream from the VSAT uses a high speed inroute.

18. A non-transitory computer-readable storage medium with an executable program stored thereon, wherein the program instructs a processor, for providing a high symbol rate communication system with reduced overhead bandwidth, to:
    calculate, at a network operations center, a minimum feasible aperture length,
    calculate an aperture length based on the minimum feasible aperture length and slot sizes used by a desired inroute symbol rate, wherein the aperture length is shorter than the frame length;
    transmit the aperture length to a hub demodulator subsystem;
    broadcast the aperture length to at least one Very Small Aperture Terminal (VSAT); and
    receive at least one inroute data stream from the at least one VSAT utilizing the aperture length.

19. The storage medium of claim 18, wherein the program further instructs the processor to perform the step of transmitting the aperture length to a hub bandwidth manager.

20. The storage medium of claim 19, wherein the hub bandwidth manager transmits the minimum feasible aperture length to at least one VSAT.

21. The storage medium of claim 19, wherein the hub bandwidth manager calculates overhead slots according the aperture length and the slot sizes used by the desired inroute symbol rate and transmits the overhead slots to at least one VSAT, and wherein the VSAT dynamically adjusts to the aperture length based on the overhead slots and the desired inroute symbol rate.

22. The storage medium of claim 19, wherein the calculating the minimum feasible aperture length uses the formula:

minimum feasible aperture length=$[2j+Ts/4+Td]*2$, wherein $\pm 2j$ is burst to burst timing drift window from ideal timing, j is transmit timing jitter, Td is timing drift correction threshold, and Ts is Symbol Time.

* * * * *